April 11, 1961

E. UMBRICHT ET AL 2,979,062

POWER WASHING APPARATUS

Filed Nov. 9, 1954

INVENTORS
EMIL UMBRICHT
DEWEY EVANS
BY
Curtis, Morris & Safford.
ATTORNEYS

April 11, 1961 E. UMBRICHT ET AL 2,979,062
POWER WASHING APPARATUS

Filed Nov. 9, 1954 7 Sheets-Sheet 2

INVENTORS
EMIL UMBRICHT
DEWEY EVANS
BY
Curtis, Morris & Safford
ATTORNEYS

April 11, 1961

E. UMBRICHT ET AL 2,979,062

POWER WASHING APPARATUS

Filed Nov. 9, 1954

INVENTORS
*EMIL UMBRICHT
DEWEY EVANS*
BY

*Curtis, Morris & Safford*
ATTORNEYS

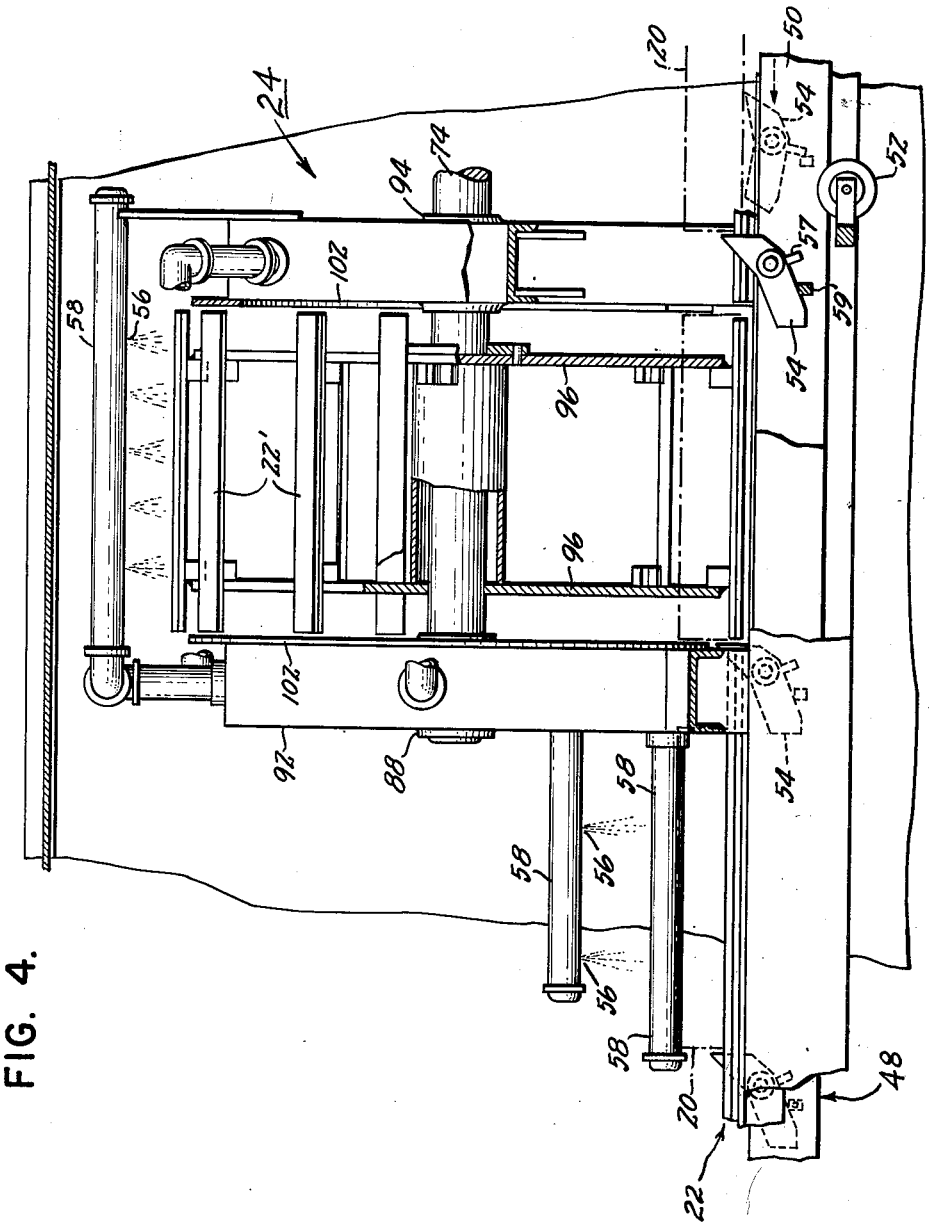

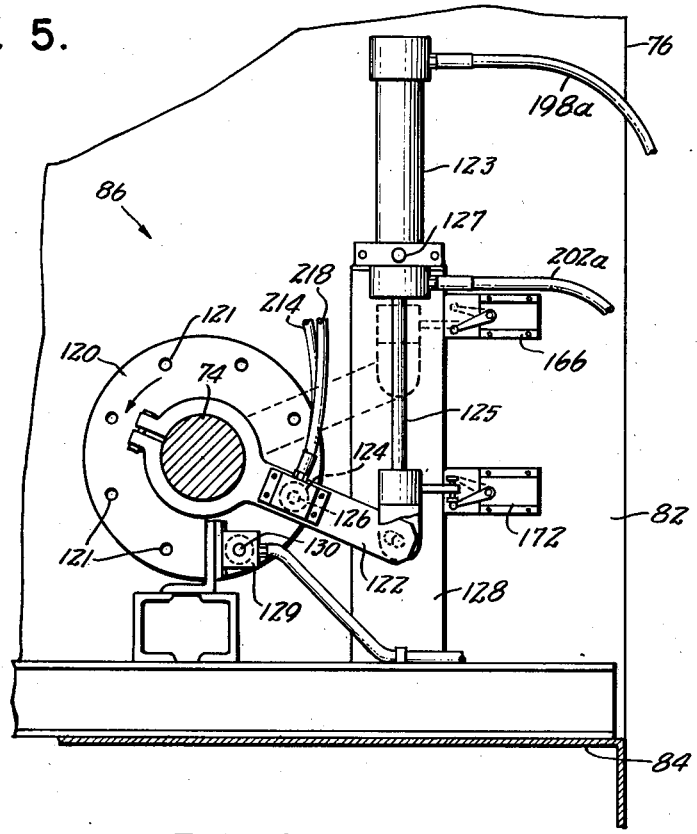

United States Patent Office 2,979,062
Patented Apr. 11, 1961

2,979,062
POWER WASHING APPARATUS
Emil Umbricht, Jackson, and Dewey Evans, Belleville, Mich., assignors to Ajem Laboratories, Detroit, Mich.
Filed Nov. 9, 1954, Ser. No. 467,746
16 Claims. (Cl. 134—66)

The present invention relates to power washing apparatus adapted for industrial applications for cleaning various manufactured articles. This invention is described as embodied in a machine for high pressure washing, rinsing, and drying of metal parts or assemblies and various other articles.

In many mass-producing type industrial applications involving the fabrication of complicated machine parts and assemblies, it is necessary at one or more points in the production schedule to remove the various soils or other materials which adhere to the surface of the articles and accumulate as a result of the previous manufacturing and fabrication steps. The need for efficient automatic apparatus to provide the required cleaning has become increasingly important for, in modern machinery such as automobiles, the parts are held to closer tolerances and the presence of only slight amounts of soil or contaminating material causes damage by corrosion and scouring after the parts are assembled and run. The type of machine described herein as embodying the present invention is well adapted for cleaning machined castings, such as automobile engine heads and transmission cases and similar articles. These kinds of articles, following their various machining operations, are characterized by complex configuration, and often include a number of intricate internal passages. Prior to the present invention, considerable difficulty has been experienced in washing such articles. It was found in many cases, after washing, that the articles retained sand or metal particles together with films of the various cutting oils used during the machining operations. Also, prior to the present invention, washing or rinsing solutions often were retained in pockets in the different passages in the articles.

In the machine described herein, the articles to be washed are supported one behind another on a track and are intermittently advanced along it. The articles pass in succession through a power washing stage, where high pressure sprays and streams of washing liquid are directed on them, and then through a power rinsing stage using sprays of rinsing liquid, and finally through a power drying stage where blasts of air quickly dry them.

Each of these stages includes a turret mechanism adapted to hold a number of the articles. Each turret picks them up one by one and revolves them step by step about an axis parallel to the track so that they are turned upside down as they are revolved. The articles are then discharged one by one from the turret back onto the track. As each one of the articles is discharged, the next is transferred from the track into the space left vacant by the previous one.

As the articles are revolved in the turret, the turret stops in a number of different angular positions, enabling high pressure jets of liquid or air, as the case may be, to strike the different machined surfaces both outside and inside of each article at the optimum angles, thus producing an efficient cleaning and drying action and requiring only a short length of time to complete the entire washing, rinsing, and drying operation.

The illustrative machine described herein is particularly well suited for the cleaning of automobile engine heads. As a result of the many advantages of the present invention, the effectiveness of the cleaning operations is increased, in many cases even enabling washing liquids at room temperatures to be used, and also the rate at which the heads can be thoroughly washed has been greatly speeded up over that which was possible with prior equipment.

Among the many advantages of the machine described is the fact that the cleansing action is enabled to be tailored to clean away the particular types of soil material which collect in specific areas and parts of the head. For example, bearing surfaces and valve seats, which must be held to close tolerances, are each individually struck by high pressure washing and rinsing sprays and are individually dried by high pressure air blasts.

A further advantage of this machine is the increase in the effectiveness of the jets of cleaning liquid obtained by eliminating any interference between them, for the cleaning of the various surfaces of each head takes place at spaced positions in the machine. The same advantage is obtained in the drying stage. The result is a most thorough cleaning and drying of each of these surfaces.

Another advantage of the machine described herein is the striking reduction in size and space required to accomplish all of the various washing, rinsing and drying steps. In the particular machine described, by virtue of the use of three turrets, each with eight positions, the effective length of the machine is cut down to approximately two-fifths that which would be required if all of the operations were carried out along a single line. During their cleaning the engine heads are moved step by step through thirty-five different positions, including the loading position, and the unloading position. By the use of the three turrets, a total of twenty-one of the thirty-five separate positions are obtained in the machine without increasing its length beyond that which would be required for only fourteen positions.

Among the further advantages of the machine described herein are those resulting from the fact that all three turrets are operated from a single drive shaft, enabling a single hydraulic cylinder to index each of them around into their eight respective positions.

Another advantage of the machine described is the use of a reciprocating transfer mechanism which intermittently advances the cylinder head blocks along a track through the machine and into and out of the three turret mechanisms.

In addition to the reduction in size obtained by the present invention, the tumbling action which results from lifting the blocks up and revolving them around in each turret is a further aid in removing all traces of sand or metal particles and in draining out the various cleaning solutions.

The various aspects, features, and advantages of the present invention will be more fully understood from the following description considered in conjunction with the accompanying drawings, in which:

Figure 1 is a side elevational view, partially diagrammatic, of a machine embodying the present invention for washing the machined head blocks of automobile engines, portions of the near side of the machine being shown cut away to indicate more clearly the various working parts;

Figure 2 is a cross-sectional view, taken generally along the line 2—2 in Figure 1 looking to the right, and showing, on enlarged scale, the arrangement of the track which guides the engine heads through the machine, showing the transfer bars which intermittently advance the blocks through the machine, together with the drive dogs which engage the rear surfaces of the respective heads to push them along, and showing the location of the various spray nozzles;

Figure 4 is a partial longitudinal sectional view, taken generally along the line 4—4 in Figure 3, looking to the left, showing further details of the wash turret and associated mechanism;

Figure 5 is a partial cross-sectional view, taken along the line 5—5 in Figure 1, looking toward the right, showing the hydraulic indexing mechanism for simultaneously rotating the wash, rinse, and drying turrets by intermittent movements of one-eighth of a full turn;

Figure 6 is a partial top view looking down generally from the line 6—6 in Figure 1, showing further details of the hydraulic indexing mechanism of Figure 5;

Figure 1:
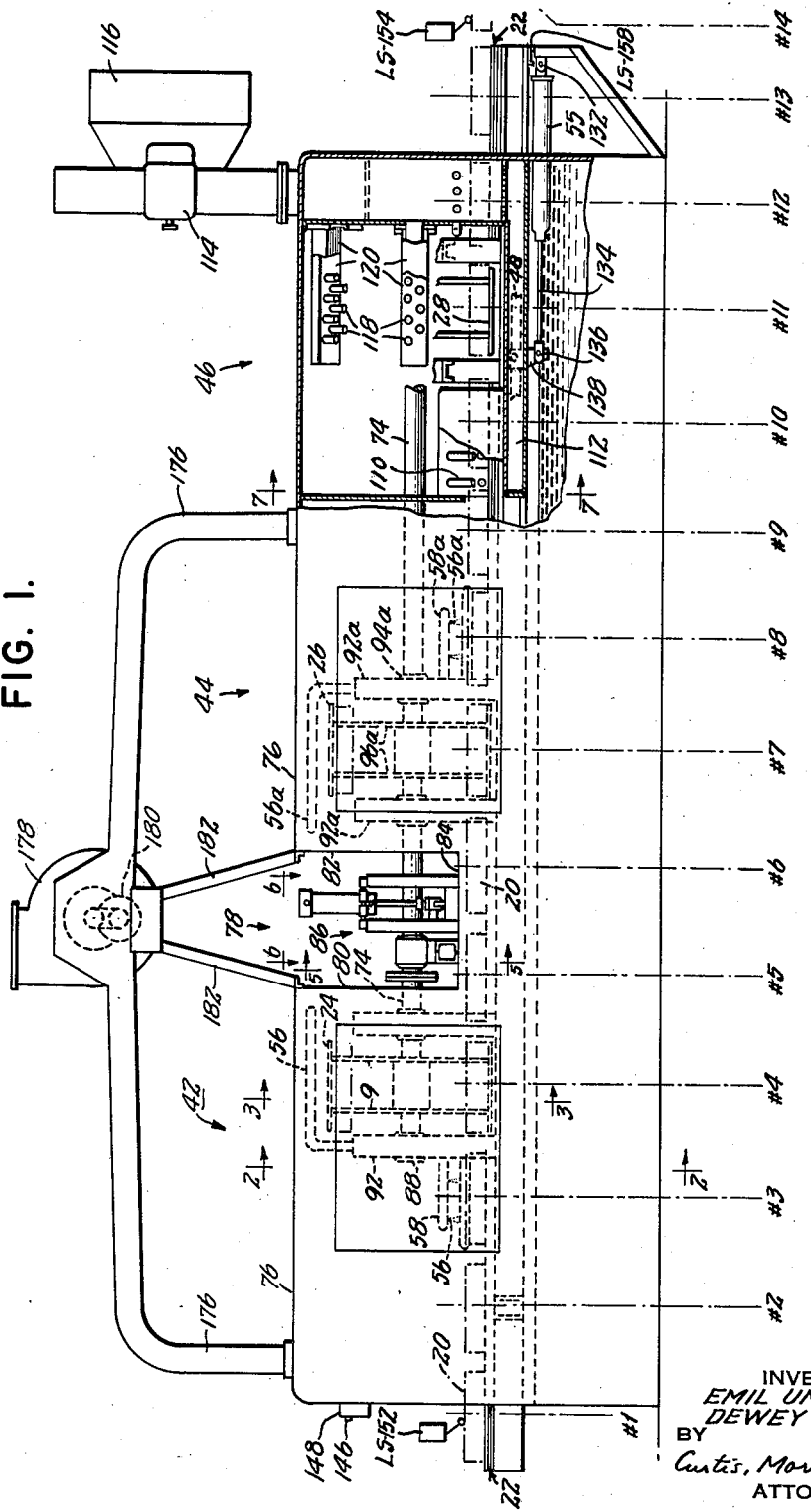

In the machine shown in Figure 1, the engine head blocks 20 to be cleaned are transferred in sequence from a production line at the left of the machine (not shown) onto a pair of spaced horizontal tracks 22 which extend through the machine to its right end, and are continuous except for three breaks to accommodate the three turrets 24, 26, and 28 described in detail hereinafter. As seen in Figure 2, the tracks 22 are located at the bottom center of the upper portion of the machine, the lower and side portions of the machine including the tanks and pumping equipment for the wash and rinse liquids, as described in detail hereinafter. The tracks 22 pass in sequence through thirteen stations in the machine, generally indicated by the reference numerals 1 through 13, and feed the cleaned and dried heads 20 to an unloading station 14 from which the heads are moved to the next production stage.

The heads rest lengthwise in the tracks with a pair of guide rails 30 against their sides and a pair of support rails 32 extending underneath. The tracks are supported by angle irons 34 projecting in from pairs of channel irons 36 along both sides of the tracks 22. These channel irons advantageously are used to form the high pressure manifolds 38 and 40, for holding the washing and rinsing liquids, respectively, in the washing and rinsing stages of the machine, as described in detail later. The heads are transferred along the tracks 22 one behind another in step by step fashion from station to station, pausing in each station for a brief period.

The washing stage, generally indicated at 42, includes stations 3 and 4, the rinsing stage, generally indicated at 44, includes stations 7 and 8, and the drying stage, generally indicated at 46, includes stations 10 and 11.

Figure 2:
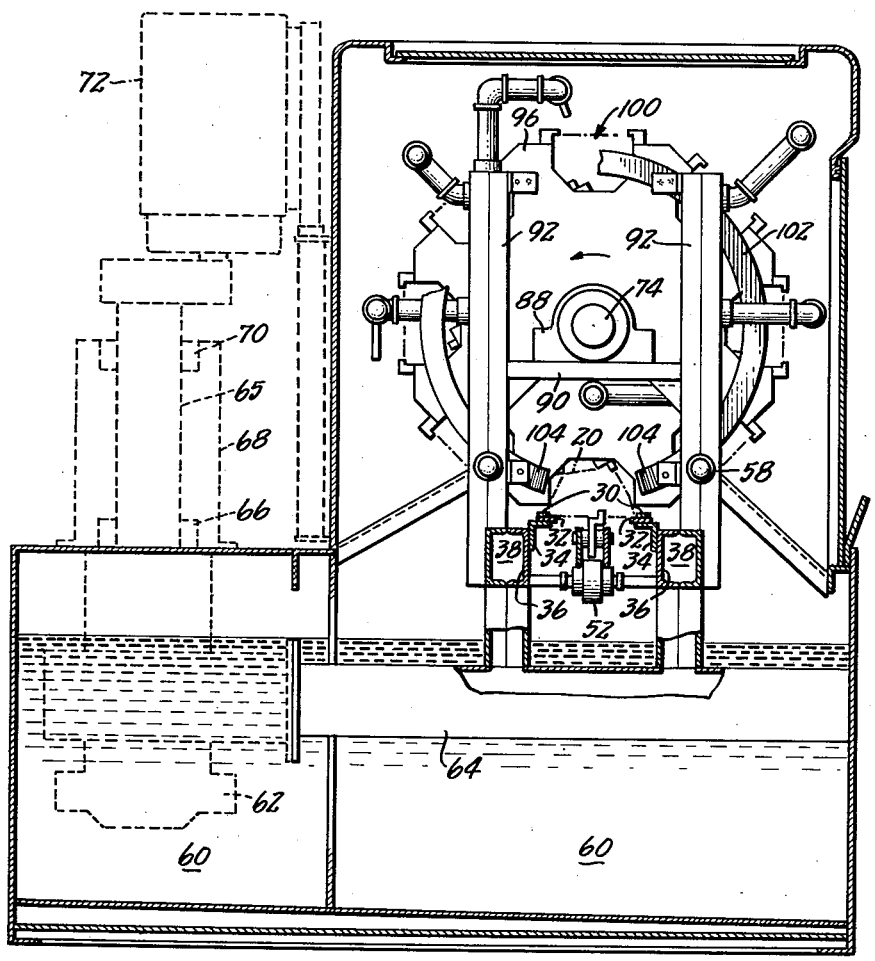
Figure 7:
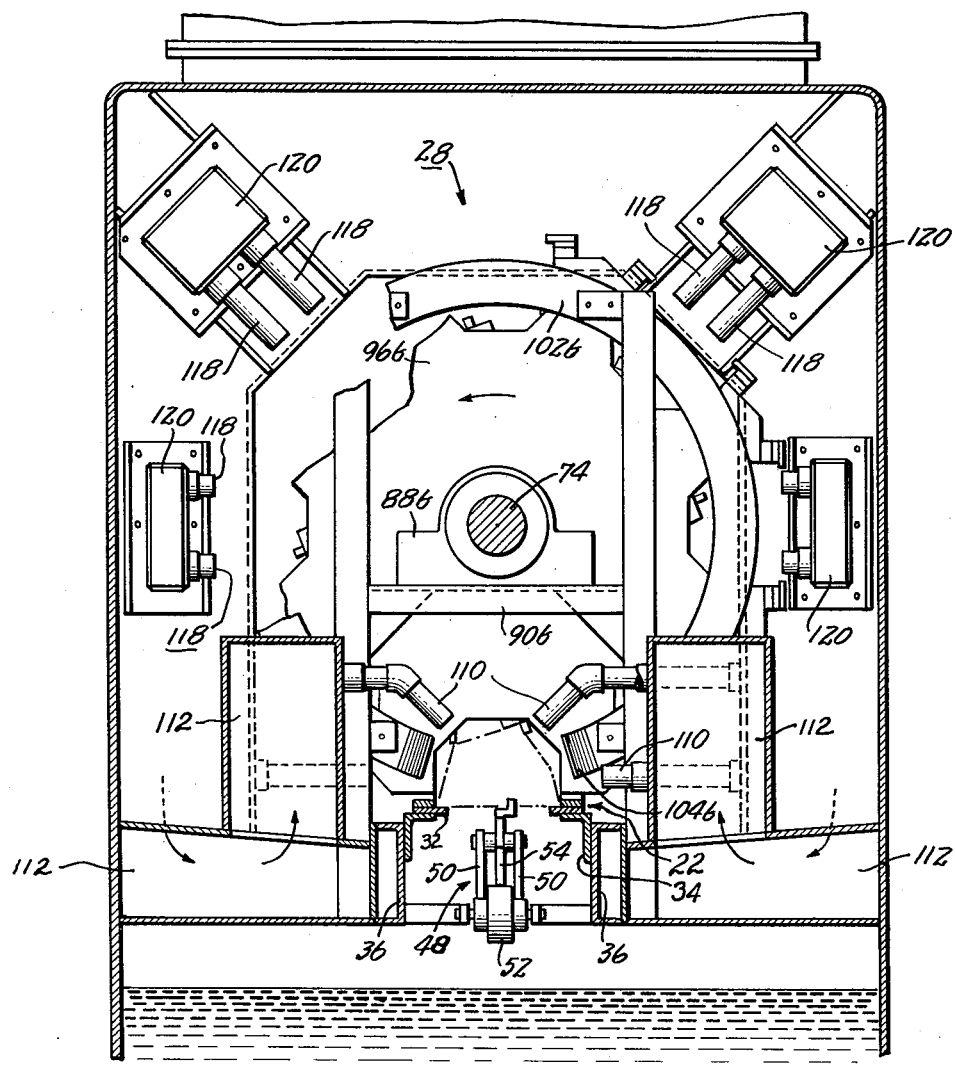
Figure 7 is a partial sectional view taken generally along the line 7—7 of Figure 1 looking to the right, showing the arrangement of the drying air pipes and air headers in the drying stage.

In order to drive the head blocks 20 along the tracks 22 through the machine, a reciprocating transfer drive bar 40 is used, operated by a hydraulic cylinder 55, seen at the right of the machine in Figure 1. This transfer bar is formed by two closely spaced parallel rods 50 (Figures 3, 4 and 7) supported on a number of roller assemblies 52 intermediate the channels 36 and including a larger diameter roller between the rods 50 to keep the transfer bar aligned with the tracks. Pivotally secured between the rods 50 at uniformly spaced distances corresponding to the spacing between stations are thirteen drive dogs 54. During each stroke of the transfer bar 48 to the right, all of the heads are engaged by the projecting points of the drive dogs 54 in their vertical position and are advanced along the tracks to the next station, a distance slightly more than their own length. The blocks remain in these stations while the transfer bar returns to its initial position. During the return stroke of the transfer bar 48, the dogs 54 are knocked down as shown in dotted lines in Figure 4 at the right, and slide back under the heads 20 until they are clear of the rear ends of the heads, at which time the dogs swing up by gravitation into position so as to be ready to pick up the rear surfaces of the heads during the next forward stroke of the transfer bar.

Projecting legs 57 prevent the dogs 54 from flipping over and stops 59 hold the dogs in driving position (see Figure 4).

Following the return stroke, the transfer bar 40 pauses before making the next forward stroke. During this period while the transfer bar is stationary, the three turrets 24, 26 and 28 rotate to their next respective angular positions, as indicated by the rotational arrows shown in Figures 2, 3, 5 and 7. In this example, as seen most clearly in Figure 3, there are eight carriages 100, described in detail further below, which are arranged around the perimeter of the respective turrets, and the turrets are turned one-eighth of a full revolution during the pause of the transfer bar 40. In order to provide clearance for accommodating rotation of the three turrets, there are three breaks or open spaces in the horizontal tracks 22, and the transfer bar 40 pauses in a position such that the various drive dogs 54 are removed from these three breaks in the rails so as to avoid interference with the respective turret mechanisms.

In station 3, as shown in Figure 2, each head 20 in turn, as it rests on the tracks 22, is sprayed by jets of washing solution from a plurality of nozzles 56, arranged generally around and above the head and connected by a plurality of horizontal and vertical pipes 58 to the pair of wash manifolds 38. These nozzles are arranged to direct high speed sprays of washing solution at various predetermined areas inside and outside of the engine head.

The washing solution is stored in a tank 60 at the bottom and off to the left of the machine as seen in Figure 2. Where desired this solution may be kept heated by suitable electric elements or steam pipes, not shown; however, the machine described can be efficiently operated with solutions at room temperature. The washing solution is sucked into the bottom of a two-stage centrifugal pump 62 and forced at high pressure through the pipes 64 to the manifolds 38. The pump shaft 65 projects up through a bearing 66 at the top of the side extension of the tank 60 and up in a housing 68 through a second bearing 70. The upper end of the shaft 65 is V-belt driven from a motor 72 supported by a bracket from the top of the machine. A suitable high pressure two-stage pump for use in this machine is described in detail and claimed in the copending application of Emil Umbricht, Serial No. 462,661, filed October 18, 1954, and now issued as Patent No. 2,873,685.

Figure 3:
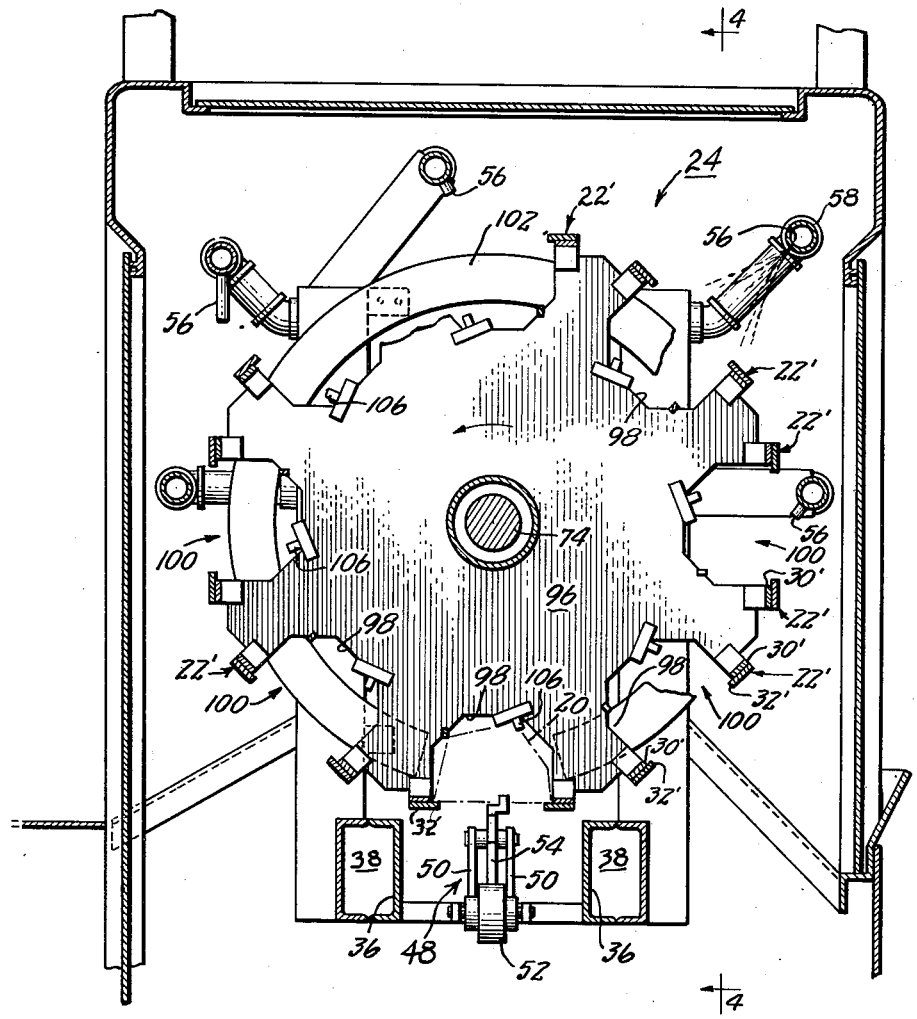
Figure 3 is a partial cross-sectional view, taken generally along the line 3—3 in Figure 1, looking to the right, and showing, on further enlarged scale, the wash turret mechanism and associated spray nozzle arrangement.

Station 4 includes the wash turret 24, as shown in Figures 3 and 4, which is supported on a rotatable shaft 74 extending parallel to and above the tracks 22.

As shown in Figure 3, the wash turret 24 is supported on a rotatable shaft 74 near one end (see also Fig. 1). The rinse turret 26 is near the middle of this shaft 74, and the drying turret 28 is at the other end. Between the wash and rinse stages the cover 76 of the machine has a large well 78 with two spaced walls 80 and 82 and a bottom 84 forming a platform for supporting a hydraulically actuated indexing mechanism 86 which serves to index all three turrets around step by step in increments of 45°. This indexing mechanism is described fully further below.

The end of the shaft 74 near the wash turret is journaled in a pillow block 88 supported on a cross brace 90 extending across above the tracks 22 between a pair of vertical manifolds 92. These vertical manifolds communicate with the horizontal manifolds 38 and, like them, are formed by a pair of channels arranged face to face with their flanges in edge to edge engagement and secured together by continuous welds to make a watertight rectangular passage. Advantageously, these manifolds 38 and 92 formed from channels serve the dual purposes of conducting liquids to the spray nozzles and of forming structural elements of the machine.

The horizontal manifolds 38 act as longitudinal braces in the machine. The tracks 22 and the roller assemblies 52 for the transfer bar 48 are all supported from the channels of the horizontal manifolds. All of the spray nozzles, the vertical manifolds 92, the cross braces, and various pillow blocks for shaft 74 are all supported from the horizontal manifolds.

Among the many advantages of this arrangement are those resulting from the fact that the need for considerable lengths of manifold piping separate from the channel elements is entirely eliminated. The cost of installing separate manifolding is removed as well as the cost and complications of separate brackets and braces to secure such separate manifolds to the frame elements, resulting in a considerable over-all simplification in design and construction together with an increase in strength provided by the high strength of the structural elements formed by the channels in flange to flange arrangement. Moreover, the resulting rectangular sections facilitate the connection of all of the various spray piping and track supports, etc., to them.

Near the opposite end of the wash turret from the bearing 88 is a second bearing 94 in which the shaft 74 is supported adjacent the wall 80 where it passes through and into the well 78 which holds the turret indexing mechanism 86.

The turret 24 has two generally circular end disks 96 rigidly secured to the shaft 74 with a spacing between them somewhat less than the length of one of the heads 20. In order to form eight carriages 100 in the turret 24 for holding eight heads at the same time and to enable the heads to be slid into these carriages from station No. 3 and to be slid out of the other end of these carriages into station No. 5, the circumference of each end disk 96 has eight identical recesses aligned with those in the other disk. Straddling these recesses and with the same spacing as the tracks 22 are short segments of track 22' including support rails 32' that extend under the heads and guide rails 30' along either side of the head. These track segments 22' align with the corresponding main tracks when each carriage is in the bottom position, i.e., at station 4.

These track segments 22' are each only very slightly longer than a head 20. A pair of C-shaped retainers 102 extend around the shaft at each end of the turret closely adjacent the ends of all of the track segments 22' except for the two track segments which are positioned in the bottom turret position in alignment with the main tracks 22. These retainers thus graze opposite ends of all of the heads in the turret and hold them in place except that the one head which is in the bottom position aligned up with the main track 22 (i.e. which is in station No. 4) is free to be transferred into station 5 while the next head is transferred from station 3 to station 4.

The ends 104 of the C-shaped retainers are flared out slightly to form, in effect, funnel mouths for receiving each head which has just been loaded, as the turret turns and lifts each head out of station 4 and commences indexing it around through the seven positions before returning it again to station 4 where it is transferred out to station 5 and replaced by the next head from station 3.

Near the apex of each of the recesses 98 are adjustable stop bolts 106 supported by brackets and having locknuts. These stops 106 are adjusted to provide headroom between themselves and the track segments 22' which is only slightly greater than the height of the heads 20. Thus, the heads slide into the carriages 100 underneath the stops 106, and when the turret revolves each head around the shaft 74 and turns it upside down, it is supported by the stops 106.

The arrangement of the rinse turret 26 is similar to the wash turret just described, and parts of the rinse turret performing functions corresponding to those in the wash turret have corresponding reference numerals followed by the suffix "a." The turret 26 is surrounded by suitably positioned spray nozzles 56a each arranged to spray streams of liquid onto predetermined areas inside and outside of the heads 20.

The carriage 100a of the rinse turret which happens to be in the bottom position forms station 7. In station 8 each head is sprayed by more nozzles 55a as it sits on the main tracks 22.

Thus, in effect, the action of the rinse stage is reversed from that of the wash stage. In the wash stage the heads receive a preliminary positioned washing in station 3 and is indexed through eight steps of first positioned washing in station 4. Whereas, in the rinsing stage the heads receive eight steps of positioned rinsing in station 7 and a final positioned rinsing in station 8.

In the drying stage 46 the heads receive a preliminary drying in station 10 by air blasts from nozzles 110 lined up along and projecting diagonally down at the tracks 22 and supplied from air manifolds 112. The air for the manifolds 112 is drawn in by a pump 114 through a heater 116 having steam pipes.

The drying turret 28 is similar to the wash turret and corresponding parts have corresponding reference numerals with the suffix "b." Around this turret are more nozzles 118 supplied by manifolds 120 connected to the pump 116. As the heads are indexed up and around by the drying turret all of any remaining rinse liquid is drained out and the various assigned regions on the heads are struck by heated air blasts arranged to impinge at the most effective angles for quick efficient drying.

The indexing mechanism 86 (please see Figures 5, 6, and 8) includes a drive wheel 120 secured to the shaft 74 with eight uniformly spaced holes 121 near its perimeter. To turn the wheel 120 a drive arm 122 is swingably mounted on the shaft 74 near the wheel 120 with a hydraulic piston and cylinder 124 extending crosswise on the arm and adapted to engage and disengage a drive pin 126 with the holes 121. An index drive cylinder 123 mounted on trunnions 127 at the top of a pair of parallel supports 128, has a piston rod 125 pivotally connected to the end of the arm 122, and is arranged to swing the arm 122 up and down. The pin 126 is engaged with a hole 121 when the arm 122 is in its lower position, and as the arm swings up it indexes the wheel 120 around 45°, as indicated by the arrow.

In order to hold the wheel 120 in this position while the arm 122 is swung back down again in preparation for the next stroke, a locking cylinder 129 secured to the machine frame is used to actuate a locking pin 130 to engage one of the holes 121. As soon as the drive pin 126 has engaged the next hole 121 in preparation for indexing the turrets to the next position, the locking pin is retracted.

While the wheel 120 is locked, the transfer bar 48 is driven toward the right by means of the hydraulic cylinder 55 (please see Figures 1 and 8) pivotally secured at 132 to the machine frame and having a long piston rod 134 connected by a pivot 136 to the end of a gusset piece welded between the two rods 50 of the bar 48 and projecting down below them into alignment with the piston rod 134.

The sequence of operation of the various parts and of the electrical and hydraulic circuits of the machine is as follows, reference also being made to the schematic diagram, Figure 8.

I. A start button 146 in an electrical control box near the loading station 1 is pressed, completing an electrical circuit to a master relay 148 which actuates the various solenoid-operated hydraulic controlled valves to condition the machine as follows:

(A) The transfer piston rod 134 is extended to its initial position.

(B) The index drive piston rod 125 is fully extended to its initial position.

(C) The index drive pin 126 is retracted from one of the holes 121.

(D) The lock pin 130 is extended into engagement with one of the holes 121.

II. If a limit switch 152 in the loading station 1 is contacted by a part in this station and a limit switch 154 in the unloading station 14 is not contacted by a part in that station, then a solenoid valve 156 is energized, causing the cylinder 55 to retract the transfer bar to the end of its stroke, where a transfer limit switch 158 is contacted by a stop on the right end of the transfer bar 48.

III. Actuating the limit switch 158 de-energizes the solenoid valve 156 and energizes the solenoid valve 160 causing the transfer cylinder 55 to return the bar 48 to its original position where another transfer limit switch 162 is actuated by the bar 48.

IV. Actuating the second transfer limit switch 162 causes the following:

(A) It de-energizes the solenoid valve 170 and energizes a solenoid valve 174, causing the index drive pin 126 to advance and the lock pin 130 to retract.

(B) It energizes a solenoid valve 164 causing the index drive cylinder 123 to retract the drive rod 125 and the drive arm 122 to the end of its stroke where and index limit switch 166 is actuated.

V. Actuating the index limit switch 166 causes the following:

(A) It starts a timer 168 which causes a dwell or pause at this point.

(B) It energizes a solenoid valve 170, causing the drive pin 126 to retract and the locking pin 130 to engage and lock the wheel 120.

VI. At the end of the dwell or pause, the solenoid valve 164 is de-energized, and a solenoid valve 172 is energized, causing the index drive arm 122 to return to its original position where and index limit switch 172 is contacted.

VII. Contacting the index limit switch 172 causes the following:

(A) A new cycle starts if the load limit switch 152 is contacted by a part in the load station 1 and the unload limit switch is not contacted by a part in the unload station 14.

The start button need not be pressed again to cause the machine to recycle.

Figure 8:
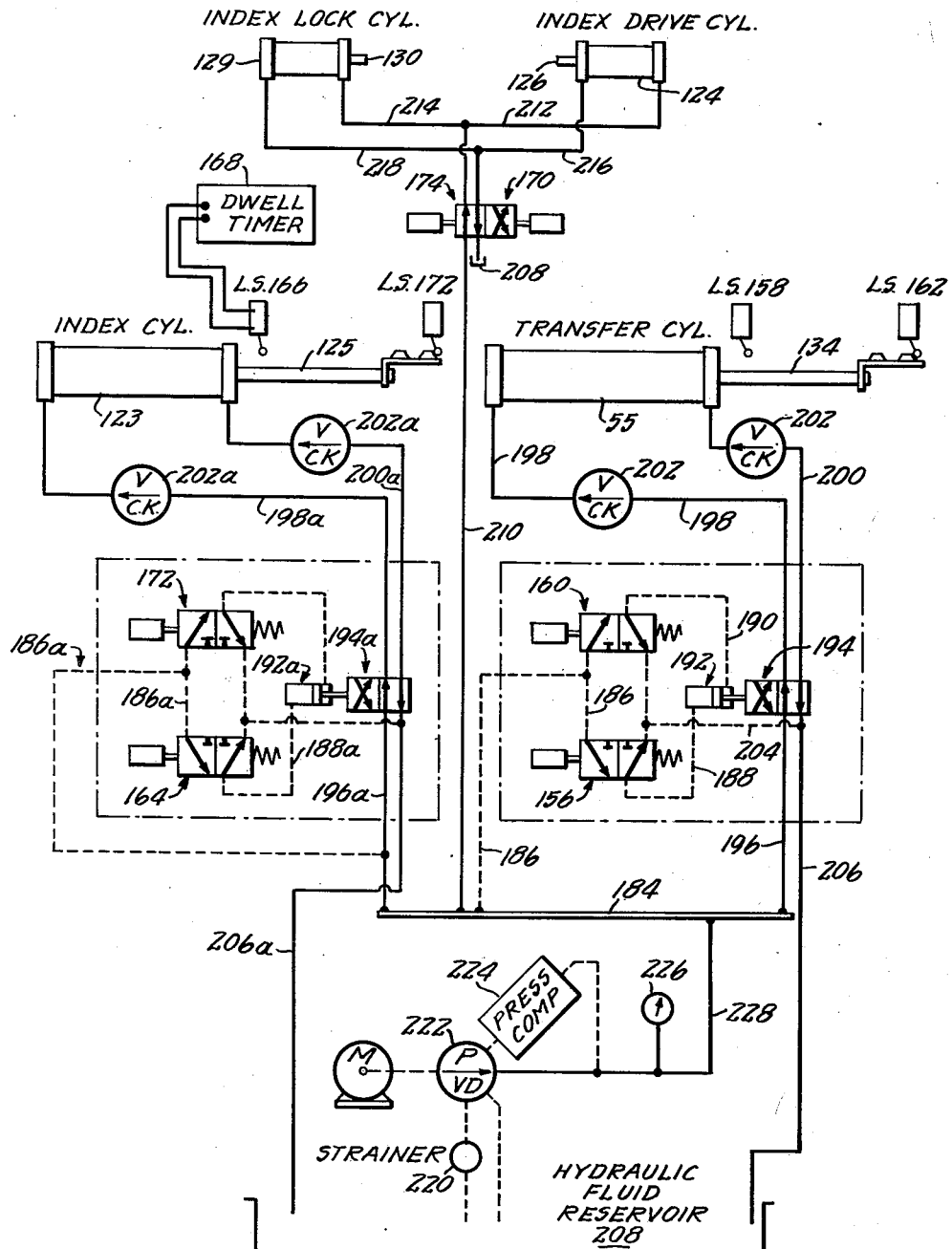
Figure 8 is a schematic diagram of the hydraulic control circuits and the electrical switch control arrangement for the machine.

As shown in Fig. 8, the main fluid lines are solid and the control lines for the piston operated valves in the main lines are dotted. The solenoid operated valves 156 and 160 control the flow of hydraulic fluid from a main supply line 184 through a line 186 connected to the valves 156 and 160. The controlled flow of fluid from the valves 156 and 160 through lines 188 and 190, respectively, to a control cylinder and piston 192 is used to control a main valve 194 controlling the flow of fluid from the supply main 184 through a line 196 to the valve 194 and from the valve 194 through the lines 198 and 200 to opposite ends of the transfer cylinder 55. Suitable flow control check valves 202 are in the lines 198 and 200. The return from the valves 156 and 160 is through a line 204 to the main return line 206 feeding back in to the fluid reservoir 208.

The solenoid-operated valves 164 and 172 operate similarly to the valves 156 and 160; so the associated control and main lines for the cylinder 123 have corresponding reference numerals to those for the cylinder 55, followed by the suffix "a." The line 210 runs from the supply manifold 184 through the valves 170 and 174. The lines 212 and 214 lead to the cylinders 124 and 128, respectively, the return lines 216 and 218 going back to the reservoir 208, as diagrammatically indicated below the valve 170.

The supply line 184 is fed from the rservoir 208 through a strainer 220 and a variable volume delivery pump 222 driven by a 3 H.P. electric motor, feeding through a pressure compensating control 224 set to 300 p.s.i.; the pump output passes a gauge 226 on a line 228 to the main 184.

In order to draw off any fumes which may arise from the washing and rinsing operations, exhaust ducts 176 connected to the cover 76 approximately over stations 1 and 9, are provided. An exhaust fan 178 is connected to the junction of the ducts 176 over the well 78. The fan 176 and its motor 180 are supported by legs 182 from the cover 76.

From the foregoing description it will be understood that the power washing apparatus of the present invention is well adapted to provide the many advantages discussed above, and that they can be adapted to a wide variety of industrial washing and cleansing operations and that various changes or modifications may be made therein, each as may be best suited to a particular application, and that the scope of the present invention as defined by the following claims, is intended to include such modifications or adaptations limited only by the prior art.

What is claimed is:

1. A parts washer comprising a machine frame, a track extending longitudinally of said frame having an intermediate open section therein, a transfer mechanism including a longitudinally reciprocating unitary bar extending along parallel to both portions of said track on opposite sides of said open section and also extending past said open section, said transfer mechanism being arranged to intermittently advance a plurality of parts along said track, indexing means on said frame passing through said open section of the track and arranged to remove said parts in sequence from said open section of said track and to index them step by step along a path while turning them over and then returning them in sequence to said open section of the track, spray jets positioned along said path arranged to spray cleaning liquid on the parts in said indexing means, and a master control arranged alternately to actuate said transfer mechanism and said indexing means.

2. A washer as claimed in claim 1 wherein said indexing means comprises a substantially circular turret rotatably mounted on the frame and having a plurality of carriages uniformly spaced around its periphery, the carriages at the periphery of said turret passing through said open section of the track when said turret is indexed, and each of said carriages providing an unobstructed opening adjacent to said bar when the respective carriage is aligned with said open section of the track.

3. A washer as claimed in claim 1 and wherein said indexing means is a turret drum mounted to rotate about a substantially horizontal axis and having a pair of end braces, a plurality of parts holders arranged around the axis of rotation, said parts holders in sequence being aligned with said open section of the track as said drum is indexed from position to position and openings in said end braces to enable loading of parts from one portion of said track through one of said end braces into said holders and unloading of parts from said holders out through the other end brace onto the other portion of said track, said holders each providing access openings at the perimeter of said drum adjacent to the transfer bar when the respective holder is aligned with said open section of the track.

4. A power washer for washing complicated manufactured articles each of which has a plurality of surfaces each requiring efficient washing and drying, said washer comprising a machine having a washing and a drying chamber, transfer means for moving manufactured articles generally horizontally through said machine in sequence along a path through said washing and drying chambers, intermittent drive means for said transfer means adapted to operate said transfer means for moving said articles with a step-by-step movement through said washing and drying chambers, first and second rotatable turrets, bearing means mounted in said machine supporting said turrets for rotation about an axis, said first turret being positioned in said washing chamber and said second turret being positioned in said drying chamber, each of said turrets having a plurality of carriages spaced about its axis, each carriage having its opposite ends open for receiving and discharging articles moved along said path, indexing drive means for intermittently rotating said turrets in a step-by-step movement about their axes with the turrets stopping in a plurality of different angular locations during each rotation, for revolving the articles about the axes of the turrets so that they are turned upside down as they are revolved step-by-step, said transfer drive means and said turret indexing drive means being arranged alternately to operate said transfer means and to rotate said turrets and to stop said turrets between each indexing movement with a respective carriage of the first turret aligned with said path at a predetermined position in said washing chamber and with a respective carriage of the second turret aligned with said path at a predetermined position in the drying chamber, the carriages of said first and second turrets providing clearance for said transfer means for loading said manufactured articles into the respective carriages of said first and second turrets in said predetermined positions in the washing and drying chambers while unloading articles therefrom, a reservoir of washing liquid, a motor-driven pump communicating therewith, a plurality of nozzles in said washing chamber connected to the output of said pump and placed at spaced positions about the axis of said first turret respectively adjacent the different angular locations in which said first turret is stopped, said nozzles being aimed at various angles for cleaning the respective surfaces of the articles in the respective carriages of the first turret during the periods when the first turret is stopped, a motor-driven air blower, and a plurality of air nozzles in said drying chamber connected to the output of said blower and placed at spaced positions about the axis of said second turret respectively adjacent the different angular locations in which said second turret is stopped, said air nozzles being aimed at various angles for drying the respective surfaces of the articles in the respective carriages of the second turret during the periods when the second turret is stopped, whereby an efficient automatic washing and drying of the manufactured articles is produced.

5. A parts washer comprising a machine frame, a track extending longitudinally of said frame adapted to support the parts to be cleaned, said track having two aligned straight portions with an open section therebetween, a transfer mechanism arranged to intermittently advance a plurality of parts along said track, and including a reciprocating bar extending along near both portions of said track and extending past said open section, a plurality of spaced pusher elements on said bar adapted to engage the parts to advance them, and reciprocating drive means coupled to said bar to reciprocate it, indexing means on said frame arranged to move transversely through said open section of the track to remove said parts in sequence from said open section of said track and to index them step by step along a path in a plane perpendicular to said track while turning them over and then returning them in sequence to said open section of the track, said indexing means providing access to parts aligned with said open section of the track to be engaged by one of said pusher elements for loading and unloading of said indexing means, said pusher elements being away from said open section of the track during motion of said indexing means, spray jets positioned along said path arranged to spray cleaning liquid on the parts in said indexing means, and a master control arranged alternately to actuate said reciprocating drive means and said indexing means.

6. A parts washer as claimed in claim 5, and wherein said indexing means includes a turret mechanism mounted for rotation about a substantially horizontal axis and includes an indexing drive mechanism for indexing said turret around its axis, the perimeter of said turret mechanism having radial openings therein giving access to parts therein which are aligned with said open section of the track.

7. A parts washer as claimed in claim 6, wherein said indexing drive mechanism includes a shaft connected to the turret mechanism at its axis, a wheel secured to said shaft, an arm swingably mounted on said shaft near said wheel, a drive element on said arm adapted to engage said wheel, a reciprocating member pivotally connected to said arm, said wheel having a plurality of uniformly spaced abutments, and a locking rod mounted for reciprocating movement parallel with the axis of said shaft intermittently engaging said abutments for locking said wheel.

8. A parts washer comprising a machine frame, a track extending longitudinally of said frame, said track having a plurality of straight sections with a plurality of open sections therein, a transfer mechanism including a transfer bar extending along the length of said track and reciprocating longitudinally including a plurality of drive elements at uniformly spaced distances therealong arranged to intermittently advance a plurality of parts along said track, a plurality of turret mechanisms revolvably mounted on said frame with their peripheries passing through respective open sections of said track and arranged to remove said parts in sequence from said open sections of said track and to revolve them step by step along circular paths whose planes extend substantially vertically so as to turn the parts over as they revolve, said turret mechanisms arranged to return the parts in sequence to said open sections of the track, the peripheries of said turret mechanisms providing access for said drive elements of the transfer mechanism to engage parts in said turret mechanisms which are aligned with the open sections of the track, said drive elements being away from said open sections of the track when said turret mechanisms are revolving, spray jets positioned around said turret mechanisms arranged to spray cleaning liquid on the parts therein, and a master control arranged alternately to actuate said transfer mechanisms and said turret mechanism.

9. A parts washer comprising a machine frame, a pair of straight parallel spaced rails forming a track extending longitudinally of said frame, said track being in two sections aligned end-to-end with an open section therebetween, a transfer mechanism arranged to intermittently advance a plurality of parts along said track, said transfer mechanism comprising a reciprocating bar extending along generally between and slightly below said rails, a plurality of spaced elements on said bar adapted to engage the parts on said rails to advance them during each forward stroke of said bar, reciprocating drive means coupled to said bar to reciprocate it, indexing means on said frame moving transversely to said two sections of track and passing through said open section between them, said indexing means being arranged to remove said parts in sequence from said open section of said track and to index them step by step along a path in a plane perpendicular to said track while turning them over and then returning them in sequence to said open section of the track, said indexing means providing access to parts therein for engagement by an element on the transfer bar when the part is in the open section of the track, said elements on the transfer bar being away from said open section of the track during movement of the indexing means, spray jets positioned along said path arranged to spray cleaning liquid on the parts in said indexing means, and a master control arranged alternately to actuate said reciprocating drive means and said indexing means.

10. A parts washer as claimed in claim 9 and wherein said spray jets are connected to supply manifolds which are formed by hollow structural elements forming integral parts of the machine frame.

11. A parts washer comprising means defining a washing chamber, a pair of spaced parallel main frame members extending longitudinally horizontally within said chamber each main frame member having a hollow rectangular cross-sectional configuration and being liquid tight forming a pair of hollow rectangular manifolds, a source of washing liquid under pressure communicating with the interior of both of said horizontal manifolds, a pair of hollow vertical manifolds each supported from a respective one of said horizontal manifolds and in liquid conducting relationship with said horizontal manifolds, said vertical manifolds being structural frame members, bearing means supported by said vertical manifolds, a rotatable parts holding fixture carried by said bearing means, a plurality of liquid conduits connected to said vertical manifolds in liquid conducting relationship therewith and having spray nozzles directed toward said fixture for washing the parts carried thereby, a pair of parallel rails mounted on respective ones of said horizontal manifolds for supporting parts being moved into and out of said fixture, and transfer mechanism for moving said parts along said rails mounted on said horizontal manifolds, whereby said horizontal manifolds are main frame members which serve the dual purposes of supporting said structure and conducting washing liquid.

12. A parts washer comprising means defining a washing chamber and a rinsing chamber, a substantially continuous track extending along said machine through said washing and rinsing chambers, said track being interrupted in each of said chambers by rotatable turrets each having short track segments therein adapted to align with and form continuations of said track when said turrets are rotated into predetermined positions, transfer mechanism operatively connected with said track including a long transfer bar extending along generally parallel to said track and having spaced elements projecting therefrom adapted to engage parts on said track and arranged to advance articles therealong and onto the track segments in said respective turrets, said turrets have access openings therein near said track segments enabling elements of the transfer bar to engage parts on said track segments when aligned with said track for unloading the parts from said turrets said elements being clear of interference with said turrets and short track segments during rotation of said turrets, spray nozzles directed at the turret in said washing chamber, and control mechanism adapted intermittently to actuate said transfer mechanism and to rotate said turrets.

13. A parts washer as claimed in claim 12 and wherein said turrets are supported on a common shaft extending generally in the direction of said track.

14. A parts washer comprising means defining a washing chamber, a track portion extending into and a track portion extending out of said chamber, said track portions being spaced apart in said chamber with an open space between the ends of the two track portions, a rotatable turret in said chamber with its periphery passing through the space between the track portions which extend into and out of said chamber, the axis of said turret extending parallel with said track portions, a plurality of spray nozzles directed at said turret for washing parts as they are revolved by said turret into various predetermined angular positions about the axis of the turret, said turret including a plurality of axially extending parallel track segments successively aligning with and bridging between said track portions as said turret is rotated to successive predetermined angular positions, said track segments forming a continuation between said track portions when said turret is rotated into said successive predetermined angular positions, the parts being loaded into and unloaded from said turret by movement in a direction parallel with the axis of the turret, and retaining means in the form of two C-shaped rings adjacent to opposite ends of said turret arranged to hold parts on said track segments when said turret is rotated out of its predetermined positions, the mouths of said two C-shaped rings being aligned with said respective two track portions for providing clearance for loading and unloading of parts into and out of said turret by movement along the track portions when a track segment forms a continuation therebetween.

15. A parts washer comprising means defining a washing chamber, a pair of spaced parallel main frame members passing through said washing chamber, said frame members being hollow and forming liquid mains for conveying washing liquid, a source of washing liquid under pressure communicating with the interior of said hollow frame members, a pair of parallel rails forming a track extending through said washing chamber generally between said frame members for holding parts being moved therethrough, each of said rails being supported by one of said frame members, parts conveying mechanism mounted on and supported by said hollow frame members for conveying parts through said washing chamber, a plurality of liquid conduits connected to said frame members, and a plurality of spray nozzles connected to said conduits for washing parts in said chamber.

16. A power washer for washing complicated manufactured articles each of which has a plurality of surfaces each requiring efficient washing and drying, said washer comprising a machine having a washing and a drying chamber, transfer means for moving manufactured articles generally horizontally through said machine in sequence along a path through said washing and drying chambers, intermittent drive means for said transfer means adapted to operate said transfer means for moving said articles with a step-by-step movement through said washing and drying chambers, first and second rotatable turrets, bearing means mounted in said machine supporting said turrets for rotation about an axis, said first turret being positioned in said washing chamber and said second turret being positioned in said drying chamber, each of said turrets having a plurality of carriages spaced about its axis, each carriage having its opposite ends open for receiving and discharging articles moved along said path, indexing drive means for intermittently rotating said turrets in a step-by-step movement about their axes with the turrets stopping in a plurality of different angular locations during each rotation for revolving the articles about the axes of the turrets so that they are turned upside down as they are revolved step-by-step, said transfer drive means and said turret indexing drive means being arranged alternately to operate said transfer means and to rotate said turrets and to stop said turrets between each indexing movement with a respective carriage of the first turret aligned with said path at a predetermined position in said washing chamber and with a respective carriage of the second turret aligned with said path at a predetermined position in the drying chamber, the carriages of said first and second turrets providing clearance for said transfer means for loading said manufactured articles into the respective carriages of said first and second turrets in said predetermined positions in the washing and drying chambers while unloading articles therefrom, said indexing drive means for said turrets including a drive shaft for turning each of said turrets, a drive wheel connected to said shaft and having a plurality of openings arranged in a circular pattern concentric with said shaft, a drive arm swingably mounted for swinging movement along an arc concentric with said shaft and adjacent to said drive wheel, a drive cylinder having a piston connected to said arm for swinging the arm, a drive member carried by said arm intermittently engaging said openings in sequence to turn said shaft, a locking cylinder mounted on the frame having a piston intermittently engaging said wheel for locking said turrets in alignment with said path, a reservoir of washing liquid, a motor-driven pump communicating therewith, a plurality of nozzles in said washing chamber connected to the output of said pump and placed at spaced positions about the axis of said first turret respectively adjacent the different angular locations in which said first turret is stopped, said nozzles being aimed at various angles for cleaning the respective surfaces of the articles in the respective carriages of the first turret during the periods when the first turret is stopped, a motor-driven air blower, and a plurality of air nozzles in said drying chamber connected to the output of said blower and placed at spaced positions about the axis of said second turret respectively adjacent the different angular locations in which said second turret is stopped, said air nozzles being aimed at various angles for drying the respective surfaces of the articles in the respective carriages of the second turret during the periods when the second turret is stopped, whereby an efficient automatic washing and drying of the manufactured articles is produced.

References Cited in the file of this patent
UNITED STATES PATENTS

| | | |
|---|---|---|
| 807,367 | Eick | Dec. 12, 1905 |
| 1,217,990 | Paridon | Mar. 6, 1917 |
| 1,459,910 | Gravely | June 26, 1923 |
| 1,684,827 | Hippenmeyer | Sept. 18, 1928 |
| 1,780,772 | Washburne | Nov. 4, 1930 |
| 1,785,352 | Krause | Dec. 16, 1930 |
| 1,827,553 | Algeo | Oct. 13, 1931 |
| 2,073,521 | Johnston | Mar. 9, 1937 |
| 2,239,073 | Arey | Apr. 22, 1941 |
| 2,338,081 | Arey | Jan. 4, 1944 |
| 2,399,205 | Campbell | Apr. 30, 1946 |
| 2,522,310 | Smith | Sept. 12, 1950 |
| 2,675,011 | Maddaford | Apr. 13, 1954 |
| 2,716,989 | Joy | Sept. 6, 1955 |